US011140476B1

(12) United States Patent
Chiu et al.

(10) Patent No.: US 11,140,476 B1
(45) Date of Patent: Oct. 5, 2021

(54) REMOTE AUDIBLE ALARM ACCESSORY FOR DETECTION INSTRUMENTS WITH AUDIO OUTPUTS

(71) Applicant: The Government of the United States of America, as represented by the Secretary of Homeland Security, Washington, DC (US)

(72) Inventors: Norman Chiu, New York, NY (US); Paul Goldhagen, New York, NY (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/182,995

(22) Filed: Feb. 23, 2021

Related U.S. Application Data

(60) Provisional application No. 63/037,357, filed on Jun. 10, 2020.

(51) Int. Cl.
| | |
|---|---|
| *H04R 3/00* | (2006.01) |
| *G08B 3/10* | (2006.01) |
| *H02M 7/06* | (2006.01) |
| *H04R 17/00* | (2006.01) |
| *H04R 29/00* | (2006.01) |
| *H02M 1/14* | (2006.01) |

(52) U.S. Cl.
CPC ............... *H04R 3/00* (2013.01); *G08B 3/10* (2013.01); *H02M 1/14* (2013.01); *H02M 7/06* (2013.01); *H04R 17/00* (2013.01); *H04R 29/001* (2013.01)

(58) Field of Classification Search
CPC ........ H04R 3/00; H04R 17/00; H04R 29/001; G08B 3/10; H02M 1/14; H02M 7/06
See application file for complete search history.

(56) References Cited

U.S. PATENT DOCUMENTS

| | | | |
|---|---|---|---|
| 3,890,612 A * | 6/1975 | Sweany | ............... B06B 1/0223 340/384.6 |
| 4,769,547 A | 9/1988 | Uber, III | |
| 4,970,391 A | 11/1990 | Uber, III | |
| RE33,807 E | 1/1992 | Abel et al. | |
| 5,103,214 A * | 4/1992 | Curran | ............... G08B 29/10 340/691.1 |
| RE34,219 E | 4/1993 | Lederer | |

(Continued)

*Primary Examiner* — Regina N Holder
(74) *Attorney, Agent, or Firm* — Lavanya Ratnam; Kelly G. Hyndman; Robert W. Busby

(57) ABSTRACT

In an example, a circuit includes: an AC piezoelectric audio transducer configured to receive an audio output signal of a source; a step-up transformer having a primary winding to receive the audio output signal of the source; a bridge rectifier having an input connected to a secondary winding of the step-up transformer; and a DC piezoelectric audio transducer connected to an output of the bridge rectifier. The AC piezoelectric audio transducer, the step-up transformer, the bridge rectifier, and the DC piezoelectric audio transducer are configured to produce an audible alarm signal based on the audio output signal of the source without powered amplification, which includes an audible sound from the AC piezoelectric audio transducer and another audible sound from the DC piezoelectric audio transducer.

23 Claims, 4 Drawing Sheets

(56) References Cited

U.S. PATENT DOCUMENTS

| | | | |
|---|---|---|---|
| 5,726,637 A * | 3/1998 | Miyahara | G08B 29/16 |
| | | | 169/23 |
| 6,040,765 A * | 3/2000 | Cherry | B60Q 1/48 |
| | | | 180/167 |
| 7,333,395 B2 | 2/2008 | Lewis et al. | |
| 10,936,073 B1 | 3/2021 | Gajiwala et al. | |
| 2007/0210724 A1 * | 9/2007 | Unkrich | H02J 7/022 |
| | | | 315/209 R |
| 2011/0044476 A1 | 2/2011 | Burlingame et al. | |
| 2013/0257607 A1 | 10/2013 | Rigby et al. | |

\* cited by examiner

REMOTE AUDIBLE ALARM ACCESSORY FOR DETECTION INSTRUMENTS WITH AUDIO OUTPUTS

CROSS-REFERENCE TO RELATED APPLICATIONS

The application claims the benefit of priority from U.S. Provisional Patent Application No. 63/037,357, filed on Jun. 10, 2020, entitled REMOTE AUDIBLE ALARM ACCESSORY FOR DETECTION INSTRUMENTS WITH EARPHONE OUTPUTS, the disclosure of which is incorporated by reference in its entirety.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to systems and methods of generating an audible sound and, more specifically, to a remote audible alarm accessory that may not require any batteries or external power.

BACKGROUND

Many detection instruments, such as radiation detectors, use a built-in audio transducer to produce an alarm sound and/or output an electronic alarm signal, for instance, to an external earphone worn by an operator.

SUMMARY

Embodiments of the present invention are directed to apparatuses and methods for providing a remote audible alarm based on a local detector alarm that may be directed to the detector's earphone output. In situations where the alarm is muffled and the use of an earphone is impractical, a remote audible alarm accessory can be connected to the detector's earphone output to produce a loud remote alarm sound that the operator can easily hear. Some of the characteristics of the accessory include the following: it does not require batteries or an external power source (e.g., no reliance on AC), does not require any maintenance, can be stored indefinitely and be immediately ready for use in an emergency, and has an enclosure strong enough to withstand being stepped on or kicked by users, including emergency responders. The accessory may produce an alarm sound that is audibly distinct from the detector's onboard alarm, allowing the user to quickly identify which alarm has been triggered.

The remote audible alarm is applicable in a variety of situations. One example involves radioactive contamination detection. A radiological release can result from an accident or from a terrorist radiological dispersal device. After the initial response to the incident, local response agencies would need to screen the public for radioactive contamination. One approach is to employ personal radiation detectors (PRDs), pedestrian radiation portal monitors, and handheld detectors to do prescreening, sensitive whole-body screening, and secondary screening to locate contamination on people. To avoid radioactive contamination of the screening facility, it is best to detect possible radioactivity on the shoes of people during prescreening before they enter the screening area where whole-body screening is done. To do that, people can be prescreened while they stand on a small raised platform with a PRD under it. Gently sloped ramps lead to and from the platform. The PRD can detect and alarm on a very small amount of radioactivity on the shoes of a person being prescreened. Because the prescreeners cannot see the PRD's alarm light, they need to be able to hear the PRD's audible alarm, but the platform muffles the alarm sound. If the prescreeners are wearing HazMat personal protective equipment (PPE), it will be even harder to hear the alarm sound. The PPE also prevents the use of an earphone.

The remote audible alarm accessory addresses the problem and other problems like it by providing a remote alarm box that can amplify and remotely broadcast the alarm signal from a radiation detector. The remote audible alarm accessory may be used for prescreening the public for radioactive contamination following a radiological or nuclear event. For this purpose, the accessory may be paired with a radiation detector positioned beneath an elevated platform to detect radioactivity on the shoes of people being prescreened.

In specific embodiments, the remote audible alarm accessory does not require any batteries or external power. It can be stored indefinitely without maintenance, even in non-environmentally controlled areas, so that it is immediately ready for use in an emergency. In one example, the remote audible alarm accessory can extend alarm sounds from a PRD underneath a ramped platform. The remote audible alarm accessory may be placed on the ground just outside the ramped platform and connected to the PRD's audio output jack with an audio adapter cable. The remote audible alarm accessory may provide a louder alarm sound and one that is different from the normal PRD alarm sound, so it can be easily heard and distinguished from alarms of the other PRDs used during prescreening. In one example, the PRD is the Thermo Scientific RadEye™ PRD-ER, and the remote audible alarm accessory may be designed for use with that model PRD.

In one embodiment, a circuit feeds an audio output signal of a source to an AC piezoelectric audio transducer that responds to alternating current (AC) signals. The audio output signal is also connected to a DC piezoelectric audio transducer that responds to direct current (DC) signals through a step-up transformer and a bridge rectifier. With a careful choice of components, the circuit allows the piezoelectric audio transducers to produce a loud alarm signal without the need for powered amplification.

The remote audible alarm accessory may be used in a wide variety of applications for providing an audible alarm at a location remote from a local alarm by using the local alarm output signal to generate the remote audible alarm without powered amplification.

In accordance with an aspect of this disclosure, a circuit comprises: an AC piezoelectric audio transducer configured to receive an audio output signal of a source; a step-up transformer having a primary winding to receive the audio output signal of the source; a bridge rectifier having an input connected to a secondary winding of the step-up transformer; and a DC piezoelectric audio transducer connected to an output of the bridge rectifier. The AC piezoelectric audio transducer, the step-up transformer, the bridge rectifier, and the DC piezoelectric audio transducer are configured to produce an audible alarm sound based on the audio output signal of the source without powered amplification. The audible alarm sound includes an audible sound from the AC piezoelectric audio transducer and an audible sound from the DC piezoelectric audio transducer.

In accordance with another aspect of the disclosure, a circuit comprises: an audio input connection for connecting to an audio output connection of a source to receive an audio output signal of the source; an AC piezoelectric audio transducer connected to the audio input connection to receive the audio output signal of the source and to produce, in response, an audible sound; a step-up transformer including a primary winding which is connected to the audio input connection, in parallel with the AC piezoelectric audio transducer, to receive the audio output signal of the source; a bridge rectifier having an input connected to a secondary winding of the step-up transformer and configured to produce a rectified signal based on a signal output from the secondary winding of the step-up transformer; and a DC piezoelectric audio transducer connected to an output of the bridge rectifier and configured to produce, in a response to the rectified signal, another audible sound. The audible sound from the AC piezoelectric audio transducer and the audible sound from the DC piezoelectric audio transducer form a combined audible alarm sound.

In accordance with another aspect of the disclosure, a method of producing an audible alarm sound from an audio output signal of a source comprises: connecting an audio input connection of a circuit to an audio output connection of the source to receive the audio output signal of the source; connecting an AC piezoelectric audio transducer to the audio input connection to receive the audio output signal of the source and produce an audible sound; connecting a step-up transformer to the audio input connection to receive the audio output signal of the source by coupling the audio output signal of the source to a primary winding of the step-up transformer; connecting an input of a bridge rectifier to a secondary winding of the step-up transformer; and connecting a DC piezoelectric audio transducer to an output of the bridge rectifier to produce another audible sound, the audible sound from the AC piezoelectric audio transducer and the audible sound from the DC piezoelectric audio transducer together forming the audible alarm sound.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

This detailed description, like the drawings, omits various details to help focus the reader's attention to the key points.

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Figure 1:
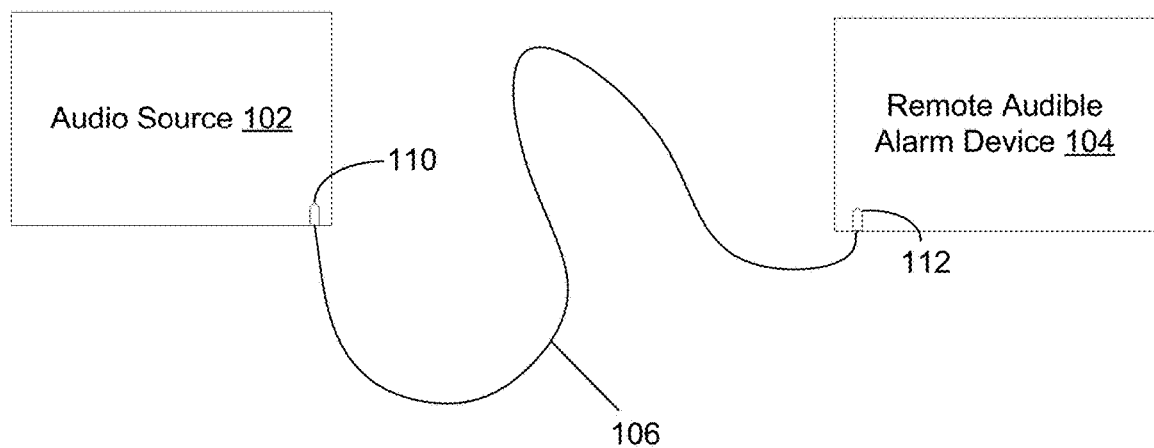
FIG. 1 show an example of an audio source and a remote audible alarm accessory.

FIG. 1 shows an example of an audio alarm signal source 102 connected to a remote audible alarm accessory device 104. The audio alarm signal source 102 is a device such as a detector that produces an audio output. In this example, the audio source may be a PRD-ER 102. When the PRD-ER 102 detects an elevated radiation level, it can produce a 5.5-volt square wave (peak-to-peak at no load) alarm signal that alternates in frequency between 1.0 kilohertz and 2.35 kilohertz. An audio adapter cable 106 may be used to connect the PRD-ER's 2.5-millimeter (mm) audio output jack 110 to the input 112 (e.g., audio input jack) of the remote audible alarm accessory device 104.

Figure 2:
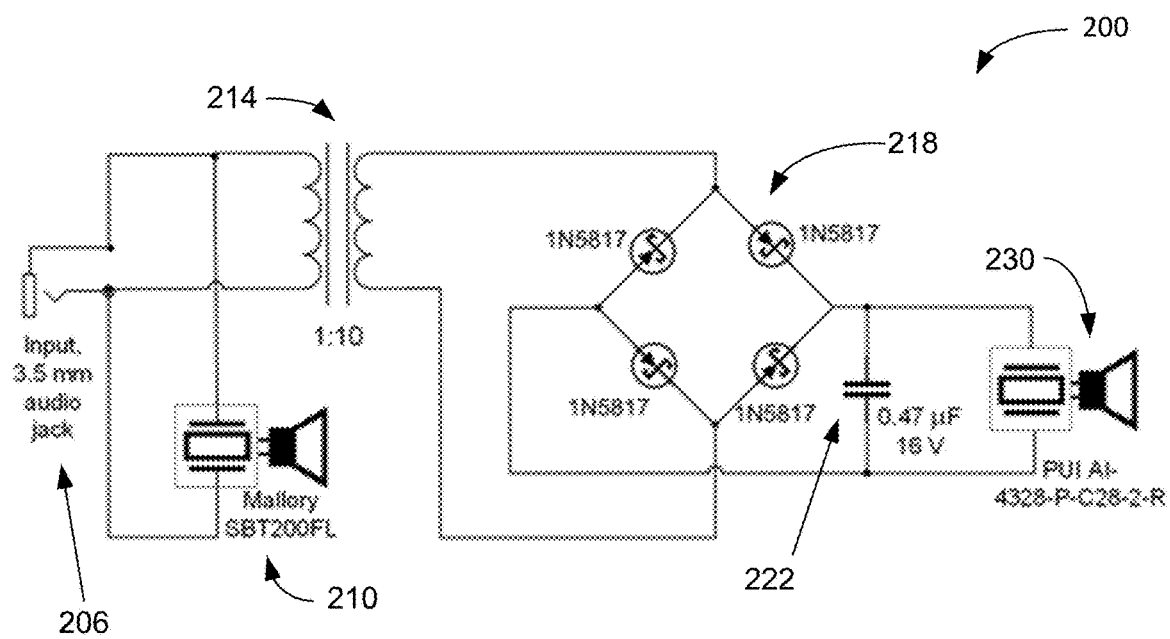
FIG. 2 shows an example of a circuit diagram of the remote audible alarm accessory.

FIG. 2 shows an example of a circuit diagram of the remote audible alarm accessory device 104. The circuit 200 includes a first piezoelectric transducer 210, a transformer 214, a bridge rectifier 218, a capacitor 222, and a second piezoelectric transducer 230.

In an embodiment, the first piezoelectric transducer 210 is implemented as an AC piezoelectric audio transducer that receives the input analog audio signal from an audio input connection such as the audio input jack 206. The AC piezoelectric audio transducer 210 is an audio signaling device. In common with other piezoelectric audio transducers, the first piezoelectric transducer 210 depends on acoustic cavity resonance, or Helmholtz resonance, to produce an audible beep. The first piezoelectric transducer 210 is connected at two terminals to the audio input jack 206.

The transformer 214 is connected at two terminals to the audio input jack 206, in parallel with the first piezoelectric transducer 210. The transformer 214 may be a step-up transformer connected in step-up configuration for the alarm signal of the audio alarm signal source 102 received at the audio input jack 206.

Diodes can be connected together to form a full-wave rectifier that converts AC voltage into pulsating DC voltage. Four diodes form a diode bridge in a bridge circuit configuration known as a bridge rectifier that provides the same polarity of output for either polarity of input. The bridge rectifier 218 is connected between the step-up transformer 214 and the capacitor 222 for AC-DC conversion. The bridge rectifier 218 provides full-wave rectification from a two-wire AC output of the transformer 214.

The circuit 200 shows one practical embodiment of the remote audible alarm accessory device 104. In this version, the audio input jack 206 is a 3.5 mm audio jack for receiving input analog audio signals (input 112 in FIG. 1). The alarm signal applied to the input is connected directly to a Mallory STB200FL alternating current (AC) piezoelectric alarm 210. When the alarm signal comes on, it energizes the AC piezoelectric alarm 210, producing an alarm sound. The Mallory STB200FL AC piezoelectric alarm 210 was selected because it produces a loud alarm sound directly from the PRD-ER output signal. This is merely an example and is not intended to exclude other suitable choices.

To increase the volume of the remote alarm's sound and produce a sound audibly different from the PRD-ER's onboard alarm, the signal from the PRD-ER 102 is altered and fed to an additional piezoelectric transducer 230; in this case, one that operates on direct current (DC). The alarm signal is fed through a step-up transformer 214, rectified using a full-wave bridge 218 (comprising four diodes) with a filter capacitor 222 and connected to a PUI AI-4328-P-C28-2-R piezoelectric DC alarm 230. This piezoelectric transducer was chosen because it can produce a loud sound from the available signal power, despite the transducer's requiring a higher voltage. A voltage step-up of 1:10 was found to produce the optimum loudness from the DC piezoelectric audio transducer 230 without substantially reducing the loudness of sound from the AC piezoelectric audio transducer 210. The transformer 214 in this embodiment, a Signal 241-4-12, is sold as a step-down transformer but is used here in reverse. The full-wave bridge 218 has four Schottky rectifier diodes. Schottky diodes are used because they have low forward voltage drops (typically 0.2 volts) and low power consumption. A 0.47 microfarad capacitor 222 is connected in parallel with the output of the bridge rectifier 218 to filter out AC ripples. The DC piezoelectric audio transducer 230 is connected to the output of the bridge rectifier 218. Fed with the stepped-up-voltage DC signal, the PUI AI-4328-P-C28-2-R piezoelectric DC alarm 230 produces an alarm sound that is not only loud, but different from the one produced by the Mallory STB200FL AC piezoelectric alarm 210 and different from the sound of the PRD-ER's onboard alarm.

In an embodiment, the circuit 200 feeds the audio output signal from a PRD-ER 102 to two piezoelectric audio transducers, one that responds to AC signals (transducer 210) and one that responds to DC (transducer 230). The audio output signal of the PRD-ER 102 in this example is a square wave with a frequency that alternates between 1.0 kHz and 2.3 kHz and an amplitude of −2.75 V to +2.75 V. The signal is connected to the AC piezoelectric audio transducer 210 directly and connected to the DC piezoelectric audio transducer 230 through the bridge rectifier 218 and the filter capacitor 222. With a careful choice of components, this relatively simple circuit 200 allows the transducers 210, 230 to produce a loud alarm signal without the need for powered amplification.

In one example, the first piezoelectric transducer 210 is a Mallory Sonalert SBT200FL device featuring a piezoelectric transducer. It is designed for low power consumption. The rated voltage range is 5 to 30 VAC peak-to-peak. It has a capacitance of 70,000 pF±30% at 120 Hz. The current draw is 1.5 mA at rated voltage. The recommended drive frequency is 200 Hz. The loudness at 10 cm is 85 to 95 dB(A), typical.

The four diodes are Schottky rectifier diodes, 1N5817, each with a low forward voltage drop and high switching speed. The pin configuration is such that current always enters through anode and always exits through cathode. The maximum average forward current rating is 1 A. The forward voltage drop is 450 mV at 1 A. The root-mean-square (RMS) reverse voltage rating is 14V. The peak repetitive reverse voltage is 20V. The transformer 214 is a Signal Transformer 241-4-12 having a step-down secondary voltage (full load) of 12.6V, an output current (maximum) of 500 mA, and a maximum Power of 6VA. The filter capacitor 222 has a capacitance of 0.47 µF and an operating voltage of 16V.

In this example, the second piezoelectric transducer 230 is a PUI Audio Inc. AI-4328-P-C28-2-R alarm having internal driver circuitry. The input type is DC. The rated voltage is 12V. The operating voltage range is 4-28V. The resonant frequency is 2.8 kHz. The Sound Pressure Level (SPL) is 97 dB @ 110 cm for 12V input. The maximum current is 8 mA.

In one embodiment, the remote audible alarm circuit 200 does not require any batteries or external power. This is achieved by selecting the components as shown in FIG. 2 and tuning the circuit 200. The circuit components are also selected to function maintenance-free or at least substantially maintenance-free while requiring no batteries or external power. The accessory device is ready for use even after long periods of storage.

As illustrated in the above-described example, the design of the maintenance-free remote alarm circuit may begin with initial measurements, by using an oscilloscope to measure the alarm signal emitted from a personal radiation detector (e.g., Thermo Scientific's RadEye PRD-ER). In an example, the alarm signal is a 5.5V square wave (peak-to-peak) that alternates in frequency between 1.0 kHz and 2.35 kHz. This leads to an understanding of the power/signal input requirements in choosing among available component options for the remote alarm circuit.

The next step may be a prototype design to explore amplification. Testing the inputs may make use of a commercially available audio amplifier to amplify the alarm signal from the PRD-ER. The amplified alarm signal may be connected to a loudspeaker to produce a louder alarm sound. Although this works to boost the volume, it requires AC or battery power. Furthermore, the amplifier consumes power continuously. A design using constant battery power is not practical (due to the need for being on constantly) and a design using AC may not be an option in view of certain requirements and specifications.

To analyze power consumption, a prototype design may make use of a simple transistor (2N3415) switching circuit (common collector) to meet the initial needs. The incoming alarm signal from the PRD-ER is connected it to the base of the transistor and then turned on. The transistor closes the circuit between its collector and emitter. This turns on the piezoelectric alarm and produces a loud alarm sound because a 9V battery is connected in series with the piezoelectric alarm, the collector, and the emitter of the transistor. The circuit consumes much less power than the audio amplifier approach. During the operation, this circuit consumes practically no power when no alarm signal is sounding from the PRD-ER. This characteristic makes the remote alarm circuit a lot more practical, since it can be left on for an extended period of time.

Because the remote alarm circuit is to be stored in an outdoor storage without any environmental controls and needs be ready to be used at any time, one design criterion to improve the circuit is that it can function without any power source to provide power amplification. Using the signal amplification and power theories from the above-described prototype designs, several options may be considered. It is possible to build an ultra-low power consumption alarm circuit that uses the alarm output signal from the PRD-ER as a power source, namely, a self-generated power source. Such a design will not require batteries. Alternatively, the alarm output signal from the PRD-ER may be directed changed to DC, but it can only reach 2.55V (5.5/2−0.2), a voltage too low to drive an alarm. A DC to DC converter may be used to boost the 2.55V, but the design may be impractical due to added complexity. This will not lead to a simple, reliable circuit that can work without a separate power source.

The next prototype design is used to investigate transforming the output signal from the detector. It involves the use of a transformer to step up the alarm output signal (5.5V AC p-p square wave) from the PRD-ER to power an alarm. Several transformers are considered, including transformers that are normally used on AC sinusoidal wave instead of AC square wave from the PRD-ER. In one example, a Signal 241-3-12 transformer is connected in step-up configuration for the alarm signal of 5.5V AC p-p square wave from the PRD-ER. Despite the fact that such a transformer is not normally used on AC square waves, the Signal 241-3-12 transformer works successfully to step up the alarm signal of 5.5V AC p-p square wave to 35V AC p-p at no load.

Having solved the engineering problem of powering the device, the next phase of the design process is to refine the design using the type of transformer identified above. The following transformers are used to experiment, down select, or make changes to the design: Signal 241-3-12, Signal 241-4-12, Signal 241-4-20, and Signal 241-5-12.

In one design-refining step of transformer selection for power efficiency, a plurality of transformers are each tested to find the most power-efficient one for the remote audible alarm circuit 200. Using the transformer in a step-up configuration, the alarm signal of the PRD-ER is connected to the primary winding in one of the above transformers. The secondary winding of the transformer 214 is connected to the input of the bridge rectifier 218 having four diodes. Schottky diodes (e.g., 1N5817) may be chosen conserve power. The Schottky diodes have low forward voltage drops (typically about 0.2 volt). The filter capacitor 222 may be connected in parallel with the output of the bridge rectifier to filter out AC ripples. The DC piezoelectric audio transducer 230 (e.g., PUI AI-4328-P-C28-2-R) is also connected in parallel with the output. When the alarm signal is present at the primary winding of the step-up transformer, the alarm sound level of the DC audio piezoelectric transducer and the DC voltage and the DC wave at the output of the bridge rectifier are recorded. This test is repeated using each one of the four transformer possibilities.

In the test results, the range of the output voltages is about 5.0 to 9.0 V DC. The DC wave shows the details of charging and discharging the filter capacitor. The Signal 241-4-12 transformer is identified as the most power efficient transformer (output=9.0 V).

Next, it is determined that the 0.47 UF capacitor provides the suitable value for the filter capacitor because the resulting DC waves shows that its DC voltage reaches the maximum value with a minimal fluctuated ripple voltage.

In another design refining step of selecting the DC piezoelectric audio transducer 230, a plurality of DC piezoelectric audio transducers are tested. The PUI AI-4328-P-C28-2-R piezoelectric DC audio transducer is found to produce the greatest alarm volume level. The power consumption is about 18 mW.

In another design-refining step of selecting the AC piezoelectric audio transducer 210, the output signal of the PRD-ER is connected directly to the AC piezoelectric audio transducer. Again, a plurality of AC piezoelectric audio transducers are tested and it is found that the Mallory STB200FL AC piezoelectric audio transducer produces the greatest alarm volume.

In the various tests, the AC piezoelectric alarms tested produce sounds similar to the standard PRD-ER alarm sounds, which can cause possible confusion about which alarm is going off. Accordingly, another design refining step is to achieve a distinctive alarm sound by combining the alarm sounds from the AC and DC piezoelectric audio transducers. A minimum sound pressure level of greater than 75 dB can be produced at a distance of five feet. The alarm sounds are loud and clear and can easily be heard by first responders who wear protective gear. The combined alarm sounds are audibly different from the sound produced by the PRD-ER's internal alarm.

In another design-refining step of ruggedization, a metal enclosure may be provided for a remote alarm box containing the remote alarm circuit to provide a durable solution while still allowing full sound transmission.

The design process, selecting the transformer and other components and combining AC and DC low-power-consumption piezoelectric alarms, produces a successful design of a maintenance-free remote alarm circuit that functions without a battery and is audibly distinctive, meeting the design requirements.

Figure 3:
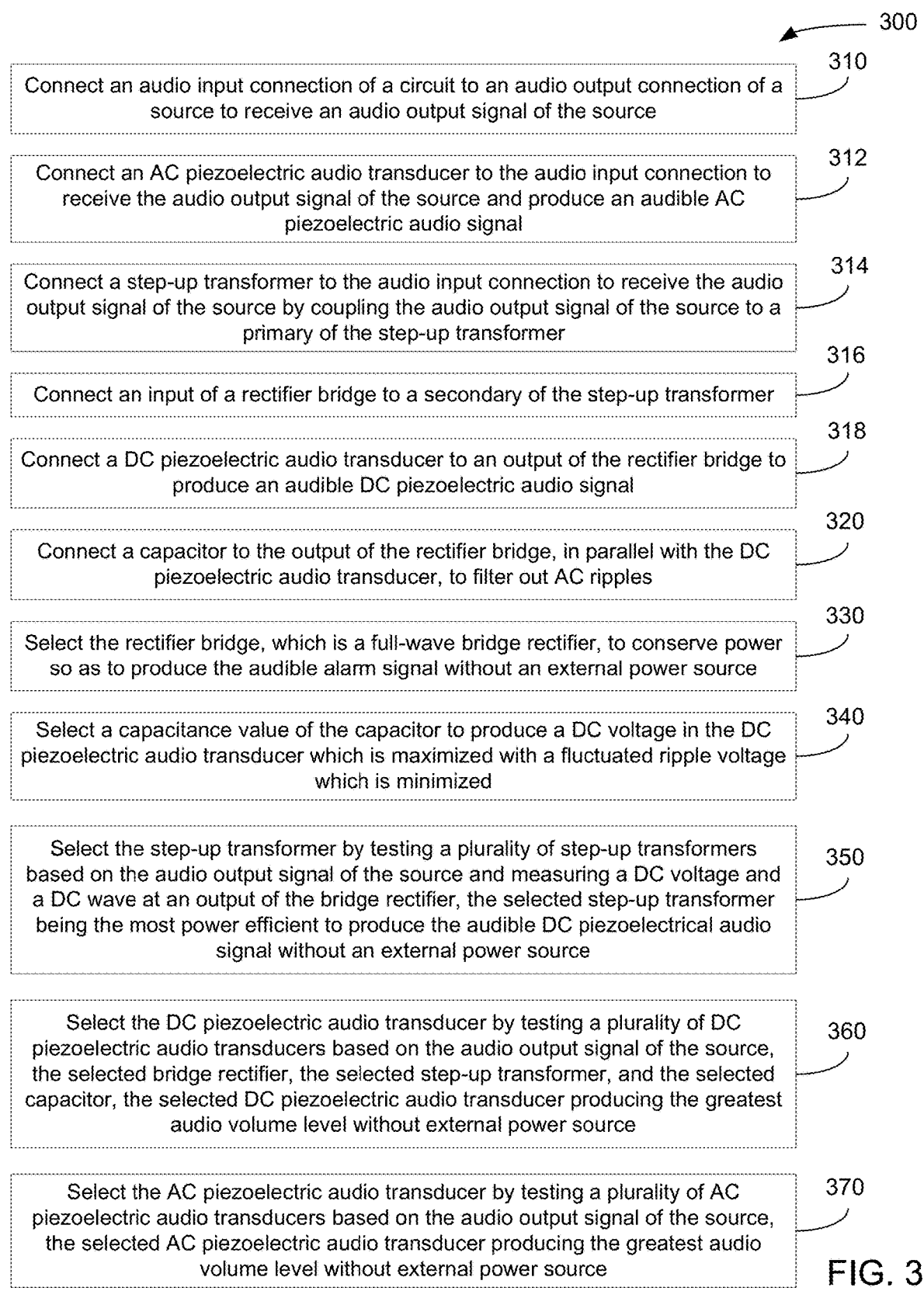
FIG. 3 is a flow diagram illustrating a process of tuning the circuit.

FIG. 3 is a flow diagram illustrating a process 300 of tuning the circuit 200. Step 310 is to connect an audio input connection 206 of a circuit to an audio output connection 110 of an audio alarm signal source 102 to receive an audio output signal of the source. Step 312 is to connect an AC piezoelectric audio transducer 210 to the audio input connection to receive the audio output signal of the source and produce an audible sound. Step 314 is to connect a step-up transformer 214 to the audio input connection to receive the audio output signal of the source by coupling the audio output signal of the source to a primary winding of the step-up transformer. Step 316 is to connect an input of a bridge rectifier 218 to a secondary winding of the step-up transformer. Step 318 is to connect a DC piezoelectric audio transducer 230 to an output of the bridge rectifier to produce an audible sound; the audible sound from the AC piezoelectric transducer and the audible sound from the DC piezoelectric transducer together forming the audible alarm sound. Step 320 is to connect the filter capacitor 222 to the output of the bridge rectifier 218, in parallel with the DC piezoelectric audio transducer, to filter out AC ripples from a signal on the output of the bridge rectifier 218.

The process selects the AC piezoelectric audio transducer 210, the step-up transformer, the bridge rectifier, and the DC piezoelectric audio transducer to produce the audible alarm sound without powered amplification. In step 330, the process selects the bridge rectifier, which is a full-wave bridge rectifier, to conserve power so as to produce the audible alarm signal without an external power source. In step 340, the process selects a capacitance value of the filter capacitor 222 to produce a DC voltage in the DC piezoelectric audio transducer which is maximized with a fluctuated ripple voltage which is minimized. In step 350, the process selects the step-up transformer 214 by testing a plurality of step-up transformers based on the audio output signal of the source, measuring a DC voltage and wave form at an output of the bridge rectifier, and determining which among the step-up transformers is the most power efficient to produce the audible DC piezoelectrical audio signal without an external power source. In step 360, the process selects the DC piezoelectric audio transducer 230 by testing a plurality of DC piezoelectric audio transducers based on the audio output signal of the source, the selected bridge rectifier, the selected step-up transformer, and the selected capacitor, and measures the audio volume level produced by the DC piezoelectric audio transducer; the selected DC piezoelectric audio transducer produces the greatest audio volume level without an external power source. In step 370, the process selects the AC piezoelectric audio transducer by testing a plurality of AC piezoelectric audio transducers based on the audio output signal of the source and determining which among the AC piezoelectric audio transducers produces the greatest audio volume level without an external power source.

The order of the steps in the process 300 of FIG. 3 is merely illustrative and not restrictive. Steps 310 to 370 are disclosed as an example form of implementing the tuning method. The order of at least some of the steps may be changed.

Figure 4:
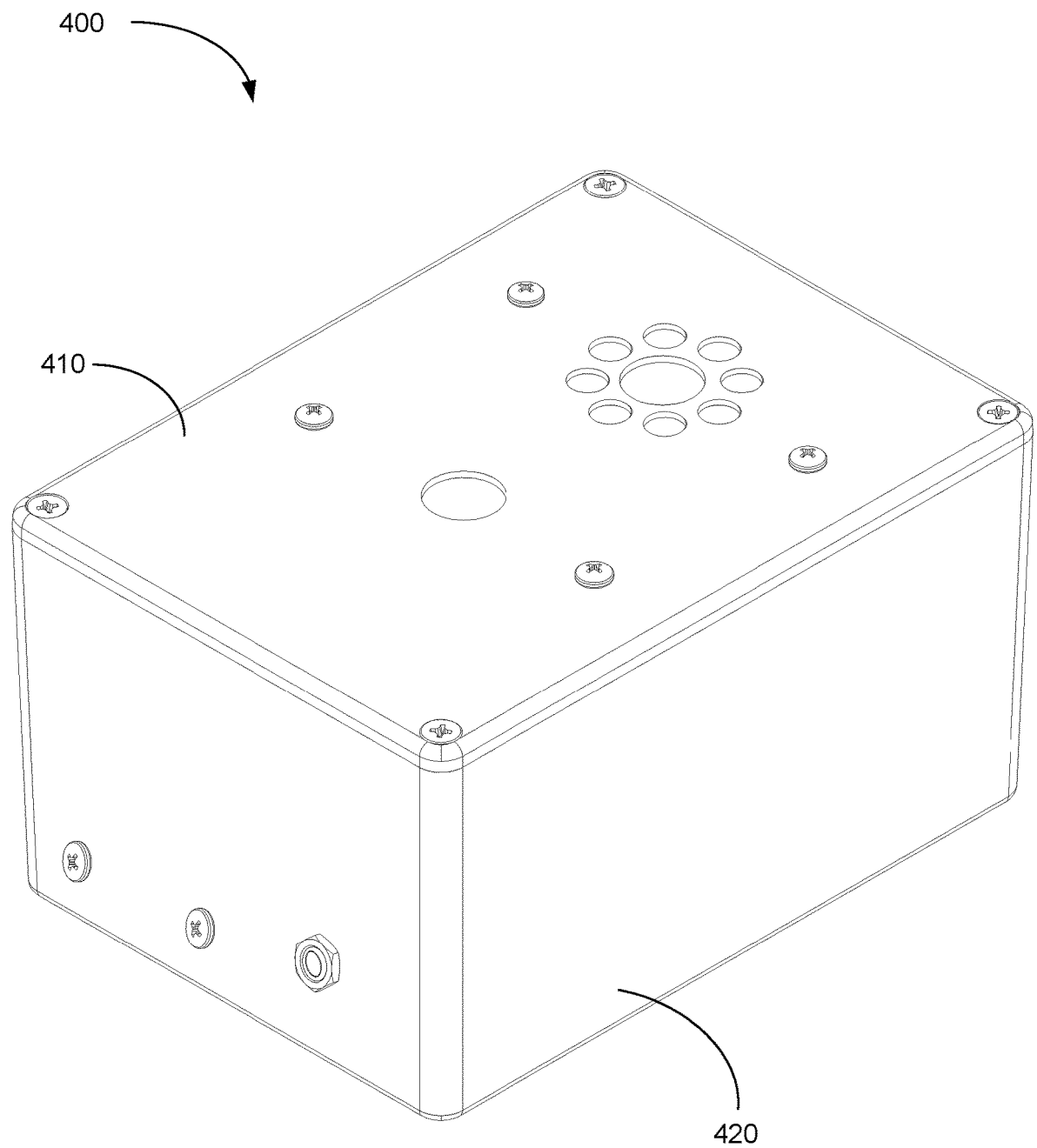
FIG. 4 shows an example of a closed box that houses a remote audible alarm accessory.

FIG. 4 shows an example of a closed box 400 that houses a remote audible alarm accessory device 104. The box 400 is typically made of metal, such as diecast aluminum. The components of the accessory device 104 are mounted inside a sturdy aluminum box 400, which protects the device from mechanical shocks resulting from being kicked or stepped on during use. In an example, the box 400 has holes in the lid that allow the sound produced by the transducers to escape. A plastic bag may be used to cover the box 400 to protect it from water and the possibility of radioactive or other contamination.

Figure 5:
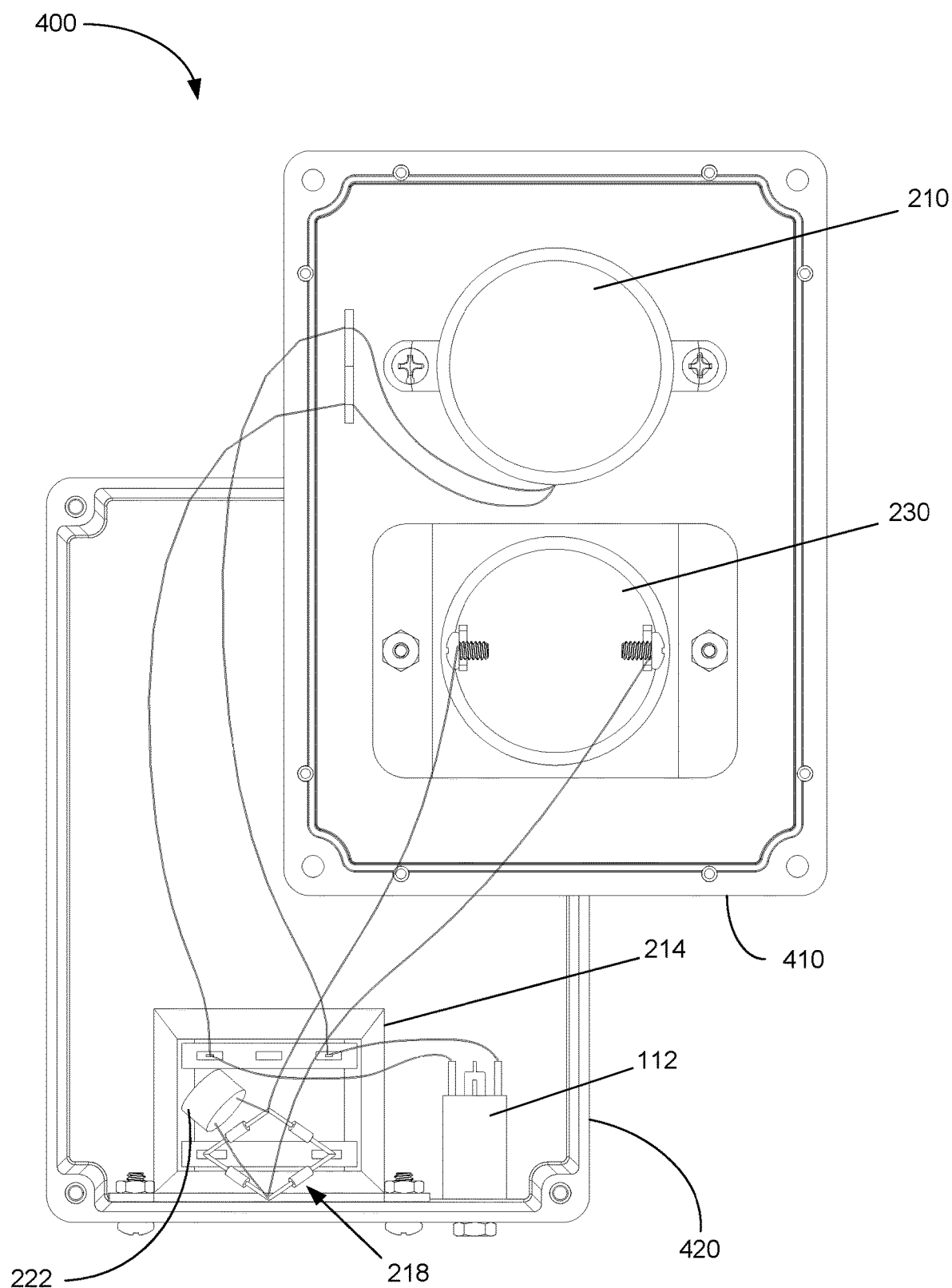
FIG. 5 shows an example of the box of FIG. 4 opened to show components.

FIG. 5 shows an example of the box 400 of FIG. 4 in an opened position. The lid 410 is removed from the container bottom 420 and turned over, showing some of the circuit components. The AC piezoelectric audio transducer 210 and the DC piezoelectric audio transducer 230 are attached to the lid 410. Both transducers are designed to be mounted at least partially outside the device's chassis. Standoffs and an interior mounting plate are used to mount them entirely inside the aluminum box 400 to protect them from damage. The transformer 214 and components of the bridge rectifier 218 including diodes are attached to the container bottom 420.

Even with the components housed in a sturdy aluminum box 400 (with holes to allow the sound to escape), the combination of the sounds from the two transducers produces a sound pressure level of about 75 decibels (A weighted) at five feet. The alarm sounds are loud and clear and can easily be heard by emergency responders wearing protective gear. The combined alarm sounds are audibly different from the sound produced by other PRDs that may be in use in the screening area at the same time, so that users can easily distinguish the alarm sounds produced by the remote audible alarm accessory from the sounds produced by nearby PRDs.

With the combination of the low-power-consumption piezoelectric alarms and the idea of converting the PRD-ER alarm signal to a significantly higher DC voltage, the remote audible alarm accessory can produce a loud alarm sound without a battery or external power source, allowing it to be stored for many years without maintenance and to be ready for immediate use in an emergency. Commercially available powered speakers or alarm circuits using powered amplification require either external power, which might not be available in emergencies, or batteries. Rechargeable batteries need to be periodically recharged or they cease to function; such required periodic maintenance may or may not be acceptable. One-use batteries also eventually lose their charge and/or leak, requiring periodic replacement, which again may or may not be acceptable.

The remote audible alarm accessory device 104 meets the need to provide remote alarm capability with a distinct sound that also accommodates the operational constraints of no external power dependencies or power storage, adequate output volume to be operationally effective, and being maintenance-free.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. The indication of any elements or steps as "optional" does not indicate that all other or any other elements or steps are mandatory.

What is claimed is:

1. A circuit comprising:
   an AC piezoelectric audio transducer configured to receive an audio output signal of a source;
   a step-up transformer having a primary winding to receive the audio output signal of the source;
   a bridge rectifier having an input connected to a secondary winding of the step-up transformer; and
   a DC piezoelectric audio transducer connected to an output of the bridge rectifier;
   the AC piezoelectric audio transducer, the step-up transformer, the bridge rectifier, and the DC piezoelectric audio transducer being configured to produce an audible alarm signal based on the audio output signal of the source without powered amplification, which includes another audible sound from the AC piezoelectric audio transducer and an audible sound from the DC piezoelectric audio transducer.

2. The circuit of claim 1,
   wherein the bridge rectifier comprises a full-wave bridge rectifier configured to conserve power so as to produce the audible alarm signal without an external power source.

3. The circuit of claim 2,
   wherein the full-wave bridge rectifier includes Schottky diodes with a forward voltage drop of less than about 0.2 volt.

4. The circuit of claim 2,
   wherein the step-up transformer is selected by testing a plurality of step-up transformers based on the audio output signal of the source, measuring a DC voltage and wave form at an output of the bridge rectifier, and determining which among the step-up transformers is most power efficient to produce the audible sound from the DC piezoelectric audio transducer without an external power source.

5. The circuit of claim 4,
wherein the selected step-up transformer is configured to produce a DC voltage of about 9V at the output of the bridge rectifier.

6. The circuit of claim 4, further comprising:
a capacitor connected to the output of the bridge rectifier, in parallel with the DC piezoelectric audio transducer, to filter out AC ripples and to produce a DC voltage in the DC piezoelectric audio transducer which is maximized with a fluctuated ripple voltage which is minimized.

7. The circuit of claim 6,
wherein the DC piezoelectric audio transducer is selected by testing a plurality of DC piezoelectric audio transducers based on the audio output signal of the source, the bridge rectifier, the selected step-up transformer, and the capacitor, measuring an audio volume level of the audible sound produced by the DC piezoelectric audio transducer, and determining which among the DC piezoelectric audio transducers produces a greatest audio volume level without an external power source.

8. The circuit of claim 1, further comprising:
a capacitor connected to the output of the bridge rectifier, in parallel with the DC piezoelectric audio transducer, to filter out AC ripples.

9. The circuit of claim 8,
wherein the capacitor is configured to produce a DC voltage in the DC piezoelectric audio transducer which is maximized with a fluctuated ripple voltage which is minimized.

10. The circuit of claim 1,
wherein the AC piezoelectric audio transducer is selected to produce greatest audio volume level without an external power source.

11. A circuit comprising:
an audio input connection for connecting to an audio output connection of a source to receive an audio output signal of the source;
an AC piezoelectric audio transducer connected to the audio input connection to receive the audio output signal of the source and to produce, in response, an audible sound;
a step-up transformer including a primary winding which is connected to the audio input connection, in parallel with the AC piezoelectric audio transducer, to receive the audio output signal of the source;
a bridge rectifier having an input connected to a secondary winding of the step-up transformer and configured to produce a rectified signal based on a signal output from the secondary winding of the step-up transformer; and
a DC piezoelectric audio transducer connected to an output of the bridge rectifier and configured to produce, in a response to the rectified signal, another audible sound;
the audible sound from the AC piezoelectric audio transducer and the audible sound from the DC piezoelectric audio transducer forming a combined audible alarm sound.

12. The circuit of claim 11,
wherein the AC piezoelectric audio transducer, the step-up transformer, the bridge rectifier, and the DC piezoelectric audio transducer are configured to produce the combined audible alarm sound without powered amplification.

13. The circuit of claim 12,
wherein the bridge rectifier is a full-wave bridge rectifier configured to conserve power so as to produce the audible sound from the DC piezoelectric audio transducer without an external power source.

14. The circuit of claim 13,
wherein the step-up transformer is selected by testing a plurality of step-up transformers based on the audio output signal of the source, measuring a DC voltage and wave form at an output of the bridge rectifier, and determining which among the step-up transformers is most power efficient to produce the audible sound from the DC piezoelectric audio transducer without an external power source.

15. The circuit of claim 14, further comprising:
a capacitor connected to the output of the bridge rectifier, in parallel with the DC piezoelectric audio transducer, to filter out AC ripples, the capacitor configured to produce a DC voltage in the DC piezoelectric audio transducer which is maximized with a fluctuated ripple voltage which is minimized.

16. The circuit of claim 15,
wherein the DC piezoelectric audio transducer is selected by testing a plurality of DC piezoelectric audio transducers based on the audio output signal of the source, the bridge rectifier, the selected step-up transformer, and the capacitor, measuring an audio volume level of the audible sound produced by the DC piezoelectric audio transducer, and determining which among the DC piezoelectric audio transducers produces a greatest audio volume level without an external power source.

17. A method of producing an audible alarm sound from an audio output signal of a source, the method comprising:
connecting an audio input connection of a circuit to an audio output connection of the source to receive the audio output signal of the source;
connecting an AC piezoelectric audio transducer to the audio input connection to receive the audio output signal of the source and produce an audible sound;
connecting a step-up transformer to the audio input connection to receive the audio output signal of the source by coupling the audio output signal of the source to a primary winding of the step-up transformer;
connecting an input of a bridge rectifier to a secondary winding of the step-up transformer; and
connecting a DC piezoelectric audio transducer to an output of the bridge rectifier to produce another audible sound, the audible sound from the AC piezoelectric audio transducer and the audible sound from the DC piezoelectric audio transducer together forming the audible alarm sound.

18. The method of claim 17, further comprising:
configuring the AC piezoelectric audio transducer, the step-up transformer, the bridge rectifier, and the DC piezoelectric audio transducer to produce the audible alarm sound without powered amplification.

19. The method of claim 18,
wherein the bridge rectifier is a full-wave bridge rectifier configured to conserve power so as to produce the audible sound from the DC piezoelectric audio transducer without an external power source.

20. The method of claim 19, further comprising:
selecting the step-up transformer by testing a plurality of step-up transformers based on the audio output signal of the source, measuring a DC voltage and wave form at an output of the bridge rectifier, and determining which among the step-up transformers is most power efficient to produce the audible sound from the DC piezoelectric audio transducer without an external power source.

21. The method of claim 20, further comprising:
connecting a capacitor to the output of the bridge rectifier, in parallel with the DC piezoelectric audio transducer, to filter out AC ripples; and
selecting a capacitance value of the capacitor to produce a DC voltage in the DC piezoelectric audio transducer which is maximized with a fluctuated ripple voltage which is minimized.

22. The method of claim 21, further comprising:
selecting the DC piezoelectric audio transducer by testing a plurality of DC piezoelectric audio transducers based on the audio output signal of the source, the bridge rectifier, the selected step-up transformer, and the capacitor, measuring an audio volume level of the audible sound from the DC piezoelectric audio transducer, and determining which among the plurality of DC piezoelectric audio transducers produces a greatest audio volume level without an external power source.

23. The method of claim 17, further comprising:
selecting the AC piezoelectric audio transducer by testing a plurality of AC piezoelectric audio transducers based on the audio output signal of the source and determining which among the AC piezoelectric audio transducers produces a greatest audio volume level without an external power source.

* * * * *